United States Patent
Yun (10) Patent No.: US 8,184,315 B2
(45) Date of Patent: May 22, 2012

(54) METHOD AND APPARATUS OF PROVIDING DEVICES WITH HISTORY INFORMATION ON IMAGE FORMING JOBS

(75) Inventor: Tae-jung Yun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1204 days.

(21) Appl. No.: 11/487,971

(22) Filed: Jul. 18, 2006

(65) Prior Publication Data

US 2007/0033444 A1 Feb. 8, 2007

(30) Foreign Application Priority Data

Aug. 8, 2005 (KR) .................. 10-2005-0072332

(51) Int. Cl.
*G06F 3/12* (2006.01)
*H04N 1/00* (2006.01)
*B41J 2/38* (2006.01)
*G06Q 30/00* (2006.01)

(52) U.S. Cl. ....... 358/1.15; 358/403; 358/435; 347/195; 705/346; 705/341

(58) Field of Classification Search .................. 358/1.15, 358/1.16, 501, 505, 401, 403, 435, 448, 476; D18/54.1, 46; 347/195; 705/28, 346, 341
See application file for complete search history.

(56) References Cited

U.S. PATENT DOCUMENTS

| | | | |
|---|---|---|---|
| 2002/0138564 A1* | 9/2002 | Treptow et al. | 709/203 |
| 2002/0180785 A1* | 12/2002 | Simpson et al. | 345/745 |
| 2003/0011800 A1* | 1/2003 | Miyahara et al. | 358/1.13 |
| 2003/0011803 A1 | 1/2003 | Peter et al. | |
| 2003/0084105 A1* | 5/2003 | Wiley et al. | 709/205 |
| 2003/0154395 A1* | 8/2003 | Miura et al. | 713/200 |
| 2004/0021708 A1* | 2/2004 | Lay et al. | 347/5 |
| 2005/0052684 A1* | 3/2005 | Ferlitsch | 358/1.15 |
| 2006/0023247 A1* | 2/2006 | Yamakawa | 358/1.14 |

FOREIGN PATENT DOCUMENTS

| | | |
|---|---|---|
| JP | 10-283131 | 10/1998 |
| JP | 2001-188662 | 7/2001 |
| JP | 2003-177900 | 6/2003 |
| JP | 2004-295574 | 10/2004 |

OTHER PUBLICATIONS

Wikipedia Encyclopedia, Web Page, Jan. 14, 2005, Wikepedia Encyclopedia, p. 1-3.*

* cited by examiner

*Primary Examiner* — Benny Q Tieu
*Assistant Examiner* — Ngon Nguyen
(74) *Attorney, Agent, or Firm* — Roylance, Abrams, Berdo & Goodman, L.L.P.

(57) ABSTRACT

A method and apparatus for providing devices with job history information on image forming jobs are provided, in which job history information corresponding to image forming jobs of the devices are generated. The job history information is transmitted to any device selected from the devices.

26 Claims, 8 Drawing Sheets

```
<div class="pagebreak-frame">
<div class="main-border">
<table class="table1" border="0" cellspacing="0" cellpadding="0">
<tr>
    <td class="cell1">
<!-- INDEX BLOCK 1 -->
<div class="indexblock1">
<div class="spacerblock1" style="height: 3pt"></div>
<div class="info1"><div class="info1text">1</div></div>
</div>
    </td>
    <td class="cell2">
<div class="infoblock3">
<div class="spacerblock1" style="height: 3pt"></div>
<div class="info2">
<div class="label">
Folder<br/>
<div class="results"><!--INSERT FILE LOCATION HERE -->/MyVacation<br/></div>
Name<br/>
<div class="results"><!--INSERT FILE NAME HERE -->IMG-201-001.jpg<br/></div>
Date<br/>
<div class="results"><!--INSERT FILE DATE AND TIME HERE -->18/08/2002 - 6:53 pm<br/></div>
Pages<br/>
<div class="results"><!--INSERT PAGE HERE -->2<br/></div>
Size<br/>
<div class="results"><!--INSERT FILE SIZE HERE -->300 Kb<br/></div>
</div>
    </div>
</div>
    </td>
<td class="cell3" rowspan="4">
<!-- THIS IS A HORIZONTAL IMAGE BLOCK -->
<div class="smallpict-visible">
<!-- NOTE -->
<!-- IF ( ORIGINAL HEIGHT < ORIGINAL WIDTH ) -->
<!-- AND ( ORIGINAL HEIGHT / ORIGINAL WIDTH ) != .75 -->
<!-- THEN ( ORIGINAL IMAGE WIDTH / ORIGINAL IMAGE HEIGHT )
 * 180 = NEW HEIGHT VALUE -->
<!--THEN (180 - NEW HEIGHT VALUE ) / 2 = NEW MARGIN VALUE -->
<div class="noborders">
<img class="noborderspict" style="width: 180pt; height: 135pt; margin: 22.5pt auto" src="\\168.219.14.27/Woomool/XHTML-Print/T.Test/Anbang/temp/hp_xhtml/xhtml/6image/jpeg/img-01.jpg" alt=""/>
</div>
<div class="photopadH"><div class="photoindex">1</div></div>
</div>
    </td>
<td class="cell4" rowspan="4">
```

METHOD AND APPARATUS OF PROVIDING DEVICES WITH HISTORY INFORMATION ON IMAGE FORMING JOBS

CROSS-REFERENCE TO RELATED PATENT APPLICATION

This application claims the benefit under 35 U.S.C. §119(a) of Korean Patent Application No. 10-2005-0072332, filed on Aug. 8, 2005, in the Korean Intellectual Property Office, the entire disclosure of which is hereby incorporated by reference.

BACKGROUND OF THE INVENTION

1. Field of the Invention

The present invention relates to image formation. More particularly, the present invention relates to a method and apparatus of providing devices with job history information on image forming jobs, which allows a user to verify image forming jobs already performed and conveniently perform any one of the image forming jobs already performed again when print data transmitted to an image forming apparatus is desired to be reprinted.

2. Description of the Related Art

Conventionally, when a host wants to reprint print data already transmitted to a printer, a method of storing the file names and the paths of recent print data, which were transmitted from a computer to the printer, in a recent print data job list of a printer job window and managing the print data is used. However, in the conventional method, the host manages the print list, but cannot verify the entire job history of the printer in a predetermined period. That is, it is impossible to verify the job history information on various kinds of job data printed by the printer. The job history information is classified by the device.

In addition, since a device connected to a printer through wire/wireless communication does not manage job history information, a process of searching job data and transmitting the job data again is required when performing a reprinting process.

Accordingly, there is a need for an improved method and apparatus for verifying history information of image forming jobs.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and apparatus of providing devices with job history information on image forming jobs by generating job history information on the image forming jobs, which are instructed by the devices, and transmitting the job history information to the devices.

According to an aspect of exemplary embodiments of the present invention, there is provided a method of providing devices with job history information on image forming jobs, in which the job history information is generated on the image forming jobs of the devices; and the job history information is transmitted to any one selected from the devices.

According to another aspect of exemplary embodiments of the present invention, there is provided an apparatus of providing devices with job history information on image forming jobs, in which, a job history information generating unit generates the job history information on the image forming jobs of the devices; and a job history information transmitting unit transmits the job history information to any one selected from the devices.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
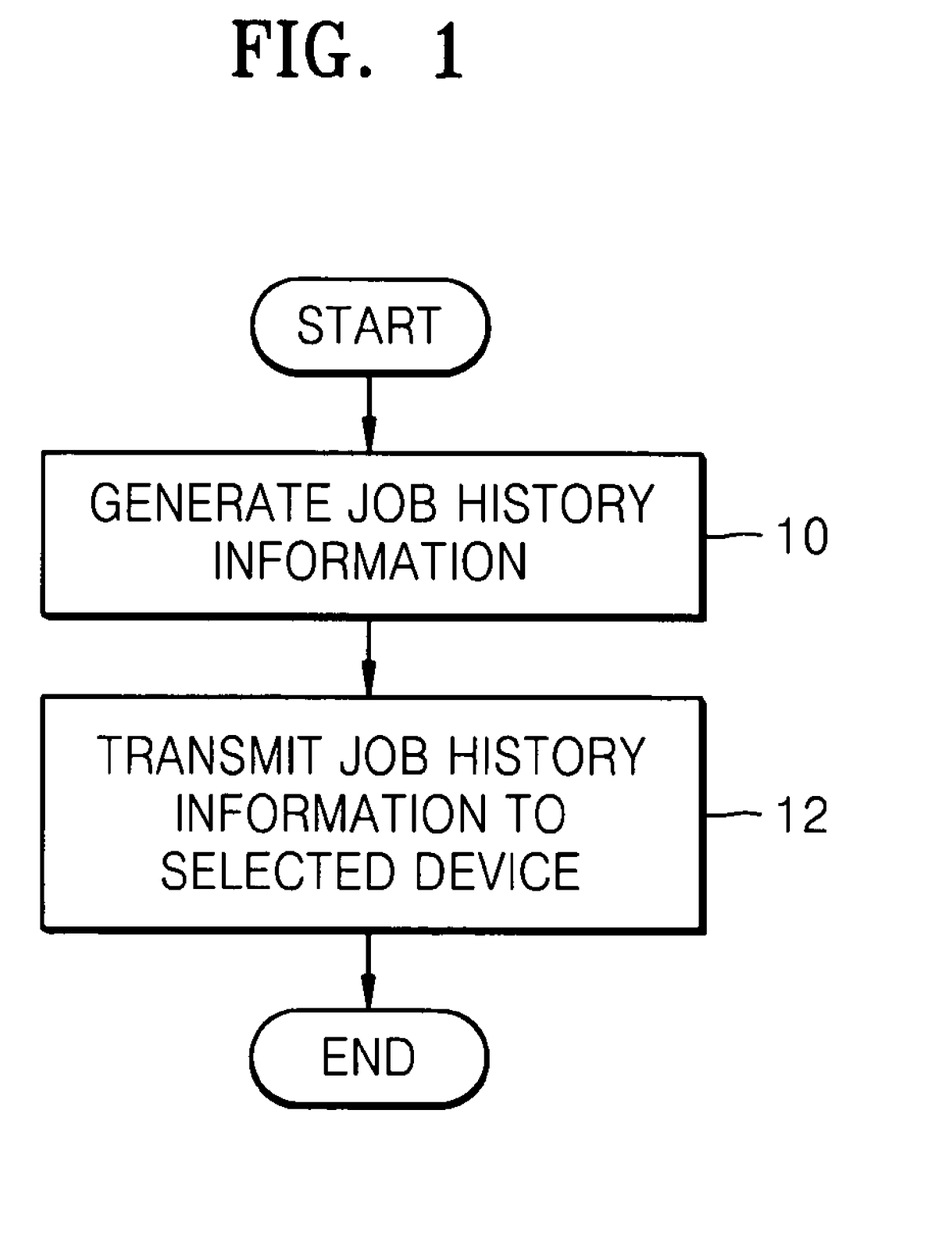
FIG. 1 is a flowchart illustrating a method of providing devices with job history information on image forming jobs according to an exemplary embodiment of the present invention.

FIG. 1 is a flowchart illustrating a method of providing devices with history information on image forming jobs according to an exemplary embodiment of the present invention.

In FIG. 1, job history information on image forming jobs of the devices is generated (step 10). At this time, each of the devices may be any one of a mobile communication terminal, personal digital assistant (PDA), and notebook type personal computer.

The job history information represents the histories of the image forming jobs which are instructed by the devices, and includes a point of time of instructing the image forming job, size of data, and kind of data.

The job history information is generated in the image forming apparatus.

Figure 2:
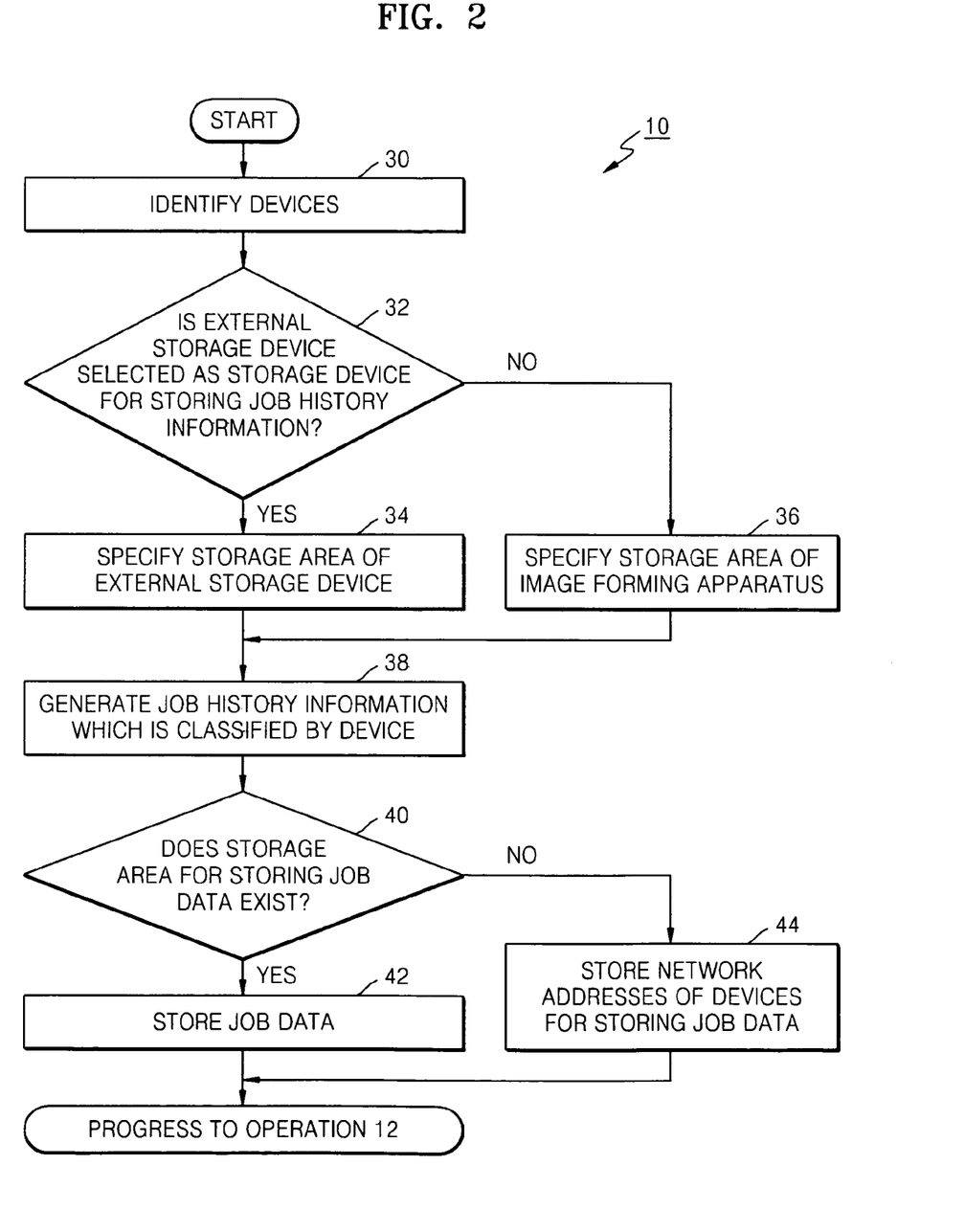
FIG. 2 is a flowchart illustrating a generating step of job history information illustrated in FIG. 1.

FIG. 2 is a flowchart illustrating step 10 illustrated in FIG. 1.

First, the devices are identified (step 30).

Figure 3:
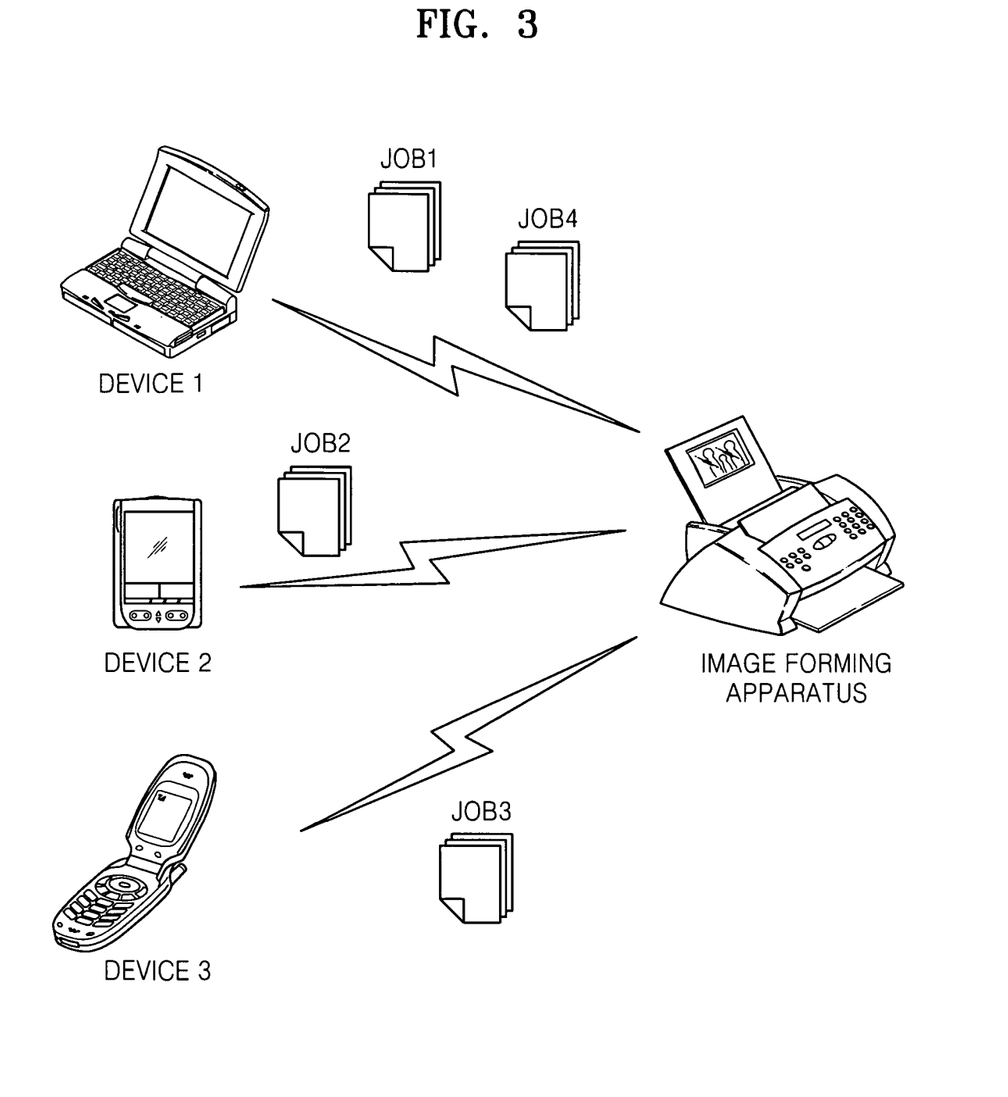
FIG. 3 is a view explaining the transmission of job data from a plurality of devices to an image forming apparatus.

FIG. 3 is a view explaining the transmission of job data from a plurality of devices to the image forming apparatus. As illustrated in FIG. 3, job data (JOB1 through JOB4) are transmitted from devices 1 through 3 to the image forming apparatus. The image forming apparatus can identify the devices which transmit the respective job data using identification information of each device.

After step 30, a determination is made as to whether an external storage device is selected as a storage device for storing the job history information (step 32). That is, a determination is made as to whether an external storage device or the image forming apparatus is selected as the storage device for storing the job history information to be generated.

If the external storage device is selected as the storage device for storing the job history information, the storage location of the external storage device for storing the job history information is specified (step 34). At this time, the external storage device must be connected to the image forming apparatus.

However, if the external storage device is not selected as the storage device for storing the job history information, the storage location of the image forming apparatus for storing the job history information is specified (step 36).

After step 34 or 36, the job history information classified for each of the identified devices is generated and stored in the specified storage location (step 38). For example, as illustrated in FIG. 3, if devices 1 through 3 instruct the image forming apparatus to form images of the job data JOB1 through JOB4, the job history information on the job data JOB1 and JOB4 are generated as the job history information on device 1, the job history information on the job data JOB2 is generated as the job history information on device 2, and the job history information on the job data JOB3 is generated as the job history information on device 3.

Figure 4:
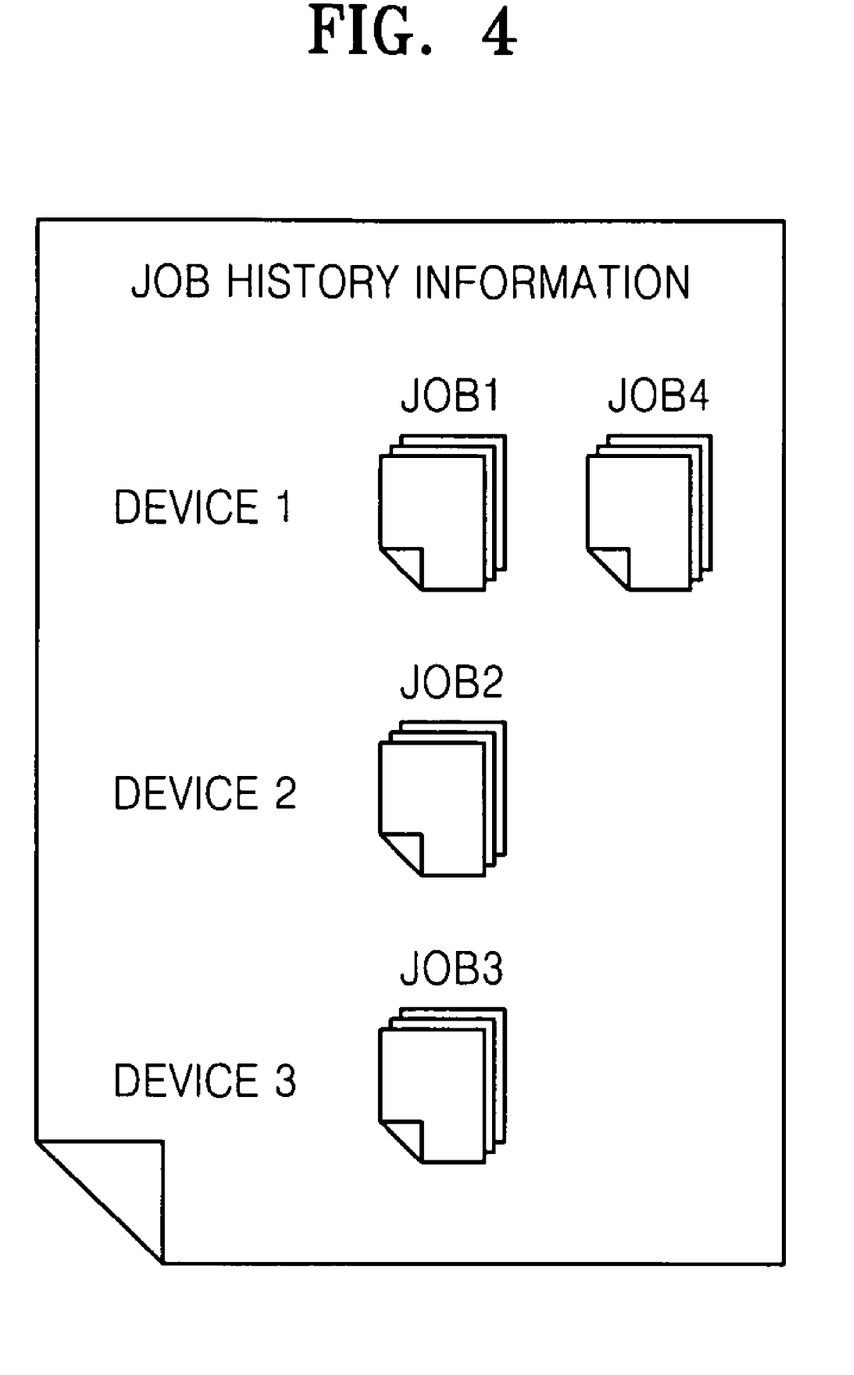
FIG. 4 illustrates an example of job history information on a plurality of job data.

FIG. 4 illustrates an example of job history information on a plurality of job data. In FIG. 4, the job history information which is classified to correspond to devices 1 through 3 is illustrated.

The job history information is generated in an extensible hypertext markup language (XHTML)-print data form. The XHTML is made by formulating hypertext markup language (HTML), which is an application of extensible markup language (XML). The XHTML-print is designed to represent image forming data which is provided from a mobile device to an image forming apparatus, among markup languages corresponding to the XHTML. Accordingly, the XHTML-print data represents the data generated by the XHTML-print.

Figure 5:
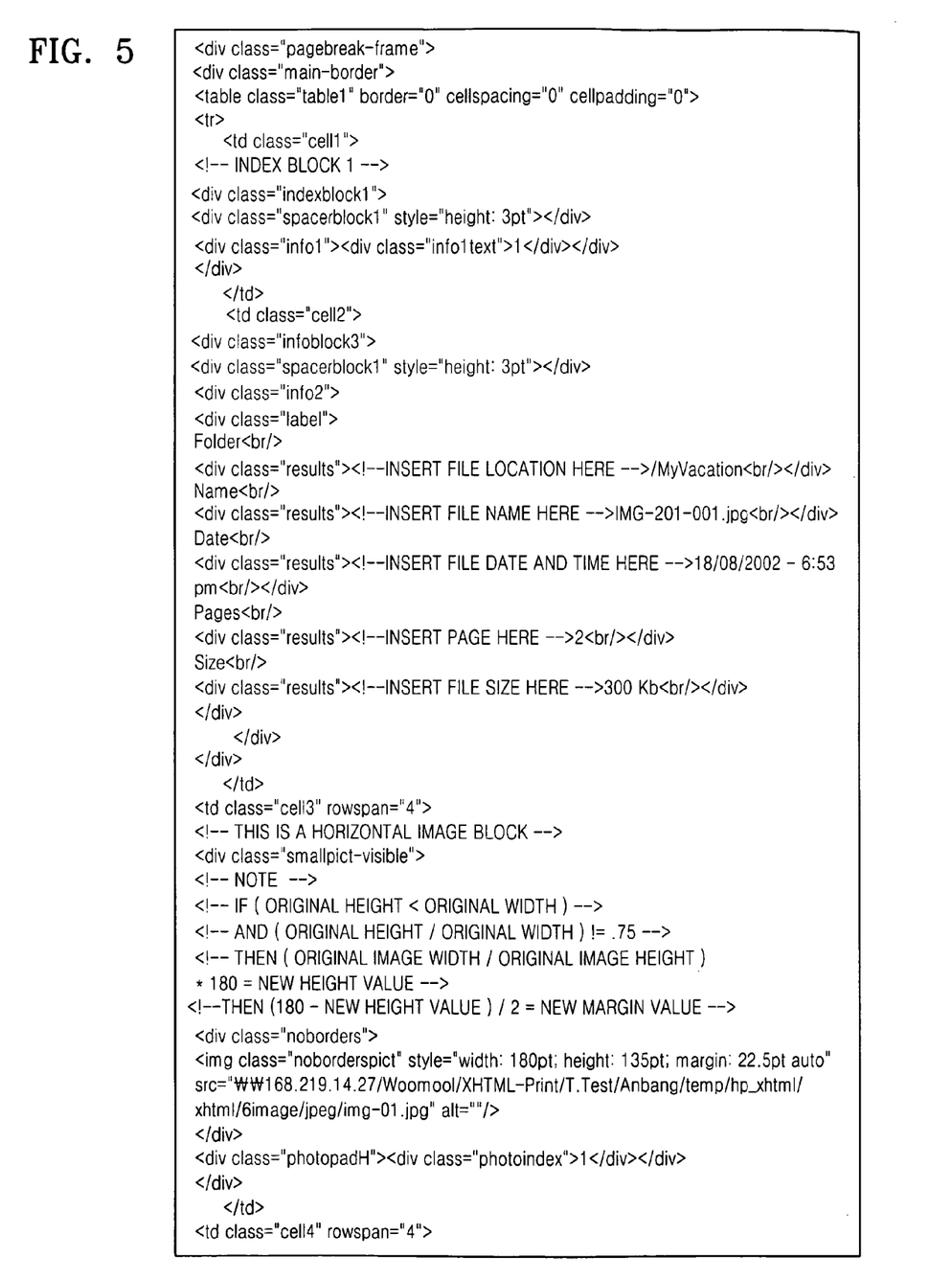
FIG. 5 illustrates an example of generating the job history information illustrated in FIG. 4 in an extensible hypertext markup language (XHTML)-print data form.

FIG. 5 illustrates an example of generating the job history information illustrated in FIG. 4 in the XHTML-print data form. As illustrated in FIG. 5, by generating the job history information in the XHTML-print data form, the devices connected to the image forming apparatus through a wire/wireless network can receive the job history information without using a separate application.

The generated job history information is stored in the storage location of the external storage device specified in step 34 or the storage location of the image forming apparatus specified in step 36.

After step 38, a determination is made as to whether a storage area for storing the job data corresponding to the job history information exists (step 40). That is, a storage area for storing the job data JOB1 and JOB4 corresponding to the job history information on device 1, the job data JOB2 corresponding to the job history information on device 2, or the job data JOB3 corresponding to the job history information on device 3 exists in the image forming apparatus or the external storage device.

If the storage area for storing the job data exists, the job data is stored in the storage area (step 42). That is, if the storage area for storing the job data exists, the job data is stored in the storage area of the image forming apparatus or the external storage device.

However, if the storage area for storing the job data does not exist, reference information of the job data is stored in any storage area (step 44). As the reference information of the job data is stored, the network addresses of the devices for storing the job data are stored. That is, if the storage area of the image forming apparatus or the external storage device is deficient, the network addresses of the devices for storing the job data are stored, instead of the job data having a large data capacity.

In an exemplary implementation, the devices for storing the job data may be the devices which instruct the image forming jobs or severs on the Internet.

The network address includes a uniform resource locator (URL) on the Internet. The URL indicates a form which can represent an address of an assessable resource on the Internet.

After step 10, the generated job history information is transmitted to any device selected from the devices (step 12).

Figure 6:
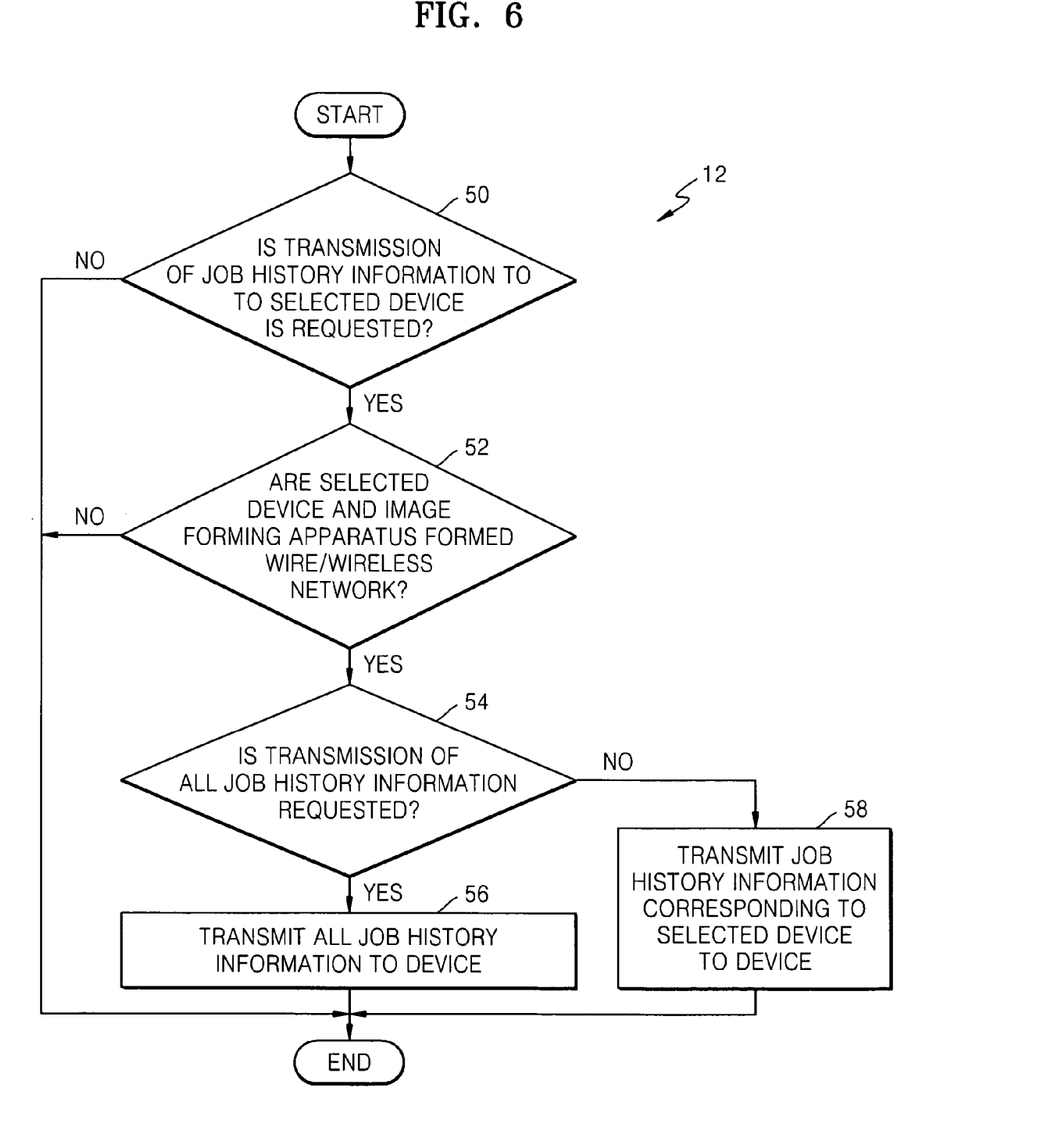
FIG. 6 is a flowchart illustrating a transmission step of job history information to a selected device illustrated in FIG. 1.

FIG. 6 is a flowchart illustrating step 12 illustrated in FIG. 1.

First, a determination is made as to whether the transmission of the job history information to the selected device is requested (step 50). A determination is made as to whether the transmission of the job history information generated in step 10 to the selected device is requested by a user.

If the transmission of the job history information to the selected device is requested, a determination is made as to whether the selected device and the image forming apparatus form the wire/wireless network (step 52). For example, if the transmission of the job history information to device 1 illustrated in FIG. 3 is requested, device 1 and the image forming apparatus form the wire/wireless network.

If the selected device and the image forming apparatus form the wire/wireless network, a determination is made as to whether the transmission of all the job history information to the selected device is requested (step 54). The job history information classified by the device is stored. Accordingly, whether the transmission of all the job history information to the device is requested must be verified.

If the transmission of all the job history information to the selected device is requested, all the job history information is transmitted to the selected device (step 56). For example, if the transmission of all the job history information to the device 1 illustrated in FIG. 3 is requested, all the job history information, that is, all the job history information illustrated in FIG. 4, is transmitted to device 1.

However, if the transmission of all the job history information to the selected device is not requested, the job history information corresponding to the selected device is transmitted to the selected device (step 58).

Figure 7:
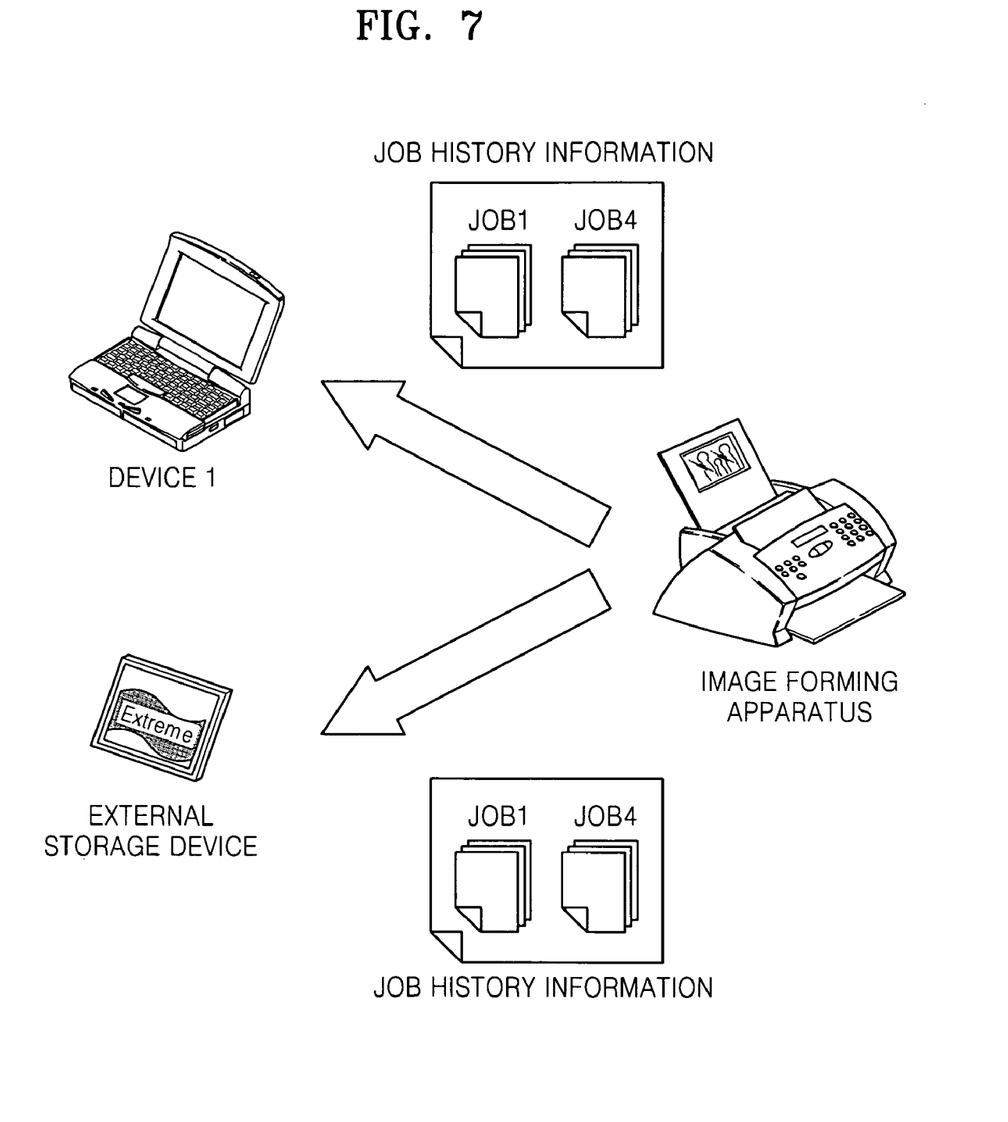
FIG. 7 is a view explaining the transmission of the job history information from the image forming apparatus to the devices.

FIG. 7 is a view explaining the transmission of the job history information from the image forming apparatus to the devices. As illustrated in FIG. 7, if the transmission of the job history information corresponding to device 1 is requested, the job history information corresponding to device 1, that is, the job history information on the job data JOB1 and JOB4, is transmitted to device 1.

In addition, the job history information may be transmitted to the external storage device, as illustrated in FIG. 7.

Furthermore, the network addresses stored in step 44 are transmitted to the selected device together with the job history information.

The job history information and the network addresses, which are transmitted to the selected device, are used as a reference material when the user perform the image forming job which was already performed again. That is, the user verifies the jobs which were already performed through the job history information and then determines which of the devices stores desired job data through the network address. Accordingly, since the user can verify the job history information and the network address, the user can conveniently perform the image forming job again.

Certain exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

Hereinafter, an apparatus of providing devices with job history information on image forming jobs according to an exemplary embodiment of the present invention will be described in detail with reference to the accompanying drawings.

Figure 8:
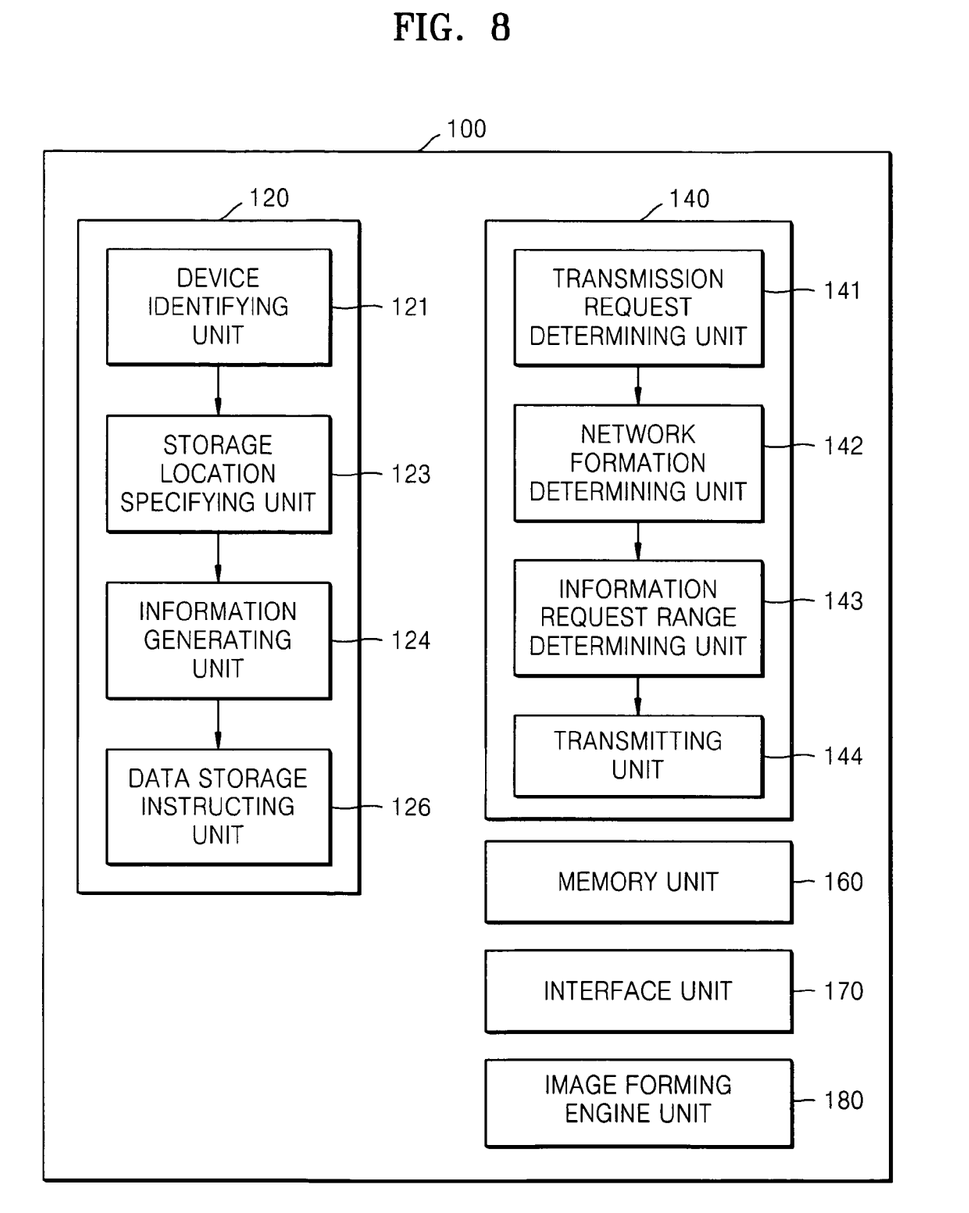
FIG. 8 is a block diagram illustrating an apparatus of providing devices with job history information on image forming jobs according to an exemplary embodiment of the present invention.

FIG. 8 is a block diagram illustrating an apparatus of providing devices with history information on image forming jobs according to an exemplary embodiment of the present invention. An image forming apparatus 100 includes a job history information generating unit 120 and a job history information transmitting unit 140. The image forming apparatus 100 also includes a memory unit 160, interface unit 170, and image forming engine unit 180.

In an exemplary implementation, each of the devices may be any one of a mobile communication terminal, personal digital assistant (PDA), and notebook type personal computer.

The job history information generating unit 120 generates the job history information on the image forming jobs of the devices. The job history information represents the histories of the image forming jobs which are instructed by the devices.

The job history information generating unit 120 includes a device identifying unit 121, storage location specifying unit 123, information generating unit 124, and data storage instructing unit 126.

The device identifying unit 121 identifies the devices and outputs the identified result to the storage location specifying unit 123. The device identifying unit 121 can identify the devices which transmit respective job data using identification information of the device.

The storage location specifying unit 123 determines whether an external storage device or the image forming apparatus is selected as a storage device for storing the job history information, specifies a storage location for storing the job history information in accordance with the determined result, and outputs the specified result to the information generating unit 124.

When the storage location specifying unit 123 specifies the external storage device as the storage location, the external storage device must be connected to the image forming apparatus 100.

The external storage device includes at least one of a universal serial bus (USB) memory and a memory card.

The information generating unit 124 generates and stores the job history information classified by the device and outputs the generated result to the data storing instructing unit 126.

For example, as illustrated in FIG. 3, if devices 1 through 3 instruct the image forming apparatus to form images of the job data JOB1 through JOB4, the information generating unit 124 generates the job history information on the job data JOB1 and JOB4 as the job history information on device 1, the job history information on the job data JOB2 as the job history information on device 2, and the job history information on the job data JOB3 as the job history information on device 3.

The information generating unit 124 generates the job history information in an XHTML-print data form. Since the information generating unit 124 generates the job history information in the XHTML-print data form, the devices connected to the image forming apparatus through a wire/wireless network can receive the job history information without using a separate application.

The image generating unit 124 stores the generated job history information in the storage location of the external storage device or the image forming apparatus specified in the storage location specifying unit 123.

The data storage instructing unit 126 determines whether a storage area for storing the job data corresponding to the job history information exists. For example, the data storage instructing unit 126 determines whether a storage area for storing the job data JOB1 and JOB4 corresponding to the job history information on device 1, the job data JOB2 corresponding to the job history information on device 2, or the job data JOB3 corresponding to the job history information on device 3 exists in the external storage device or the image forming apparatus 100.

The data storage instructing unit 126 instructs that network addresses of the devices for storing the job data is stored as reference information of the job data. In an exemplary implementation, the devices for storing the job data may be the devices which instruct the image forming apparatus 100 to perform the image forming job or severs on the Internet.

The job history information transmitting unit 140 transmits the generated job history information to any devices selected from the devices. The job history information transmitting unit 140 includes a transmission request determining unit 141, network formation determining unit 142, information request range determining unit 143, and transmitting unit 144.

The transmission request determining unit 141 determines whether the transmission of the job history information to the selected device is requested and outputs the determined result to the network formation determining unit 142.

The network formation determining unit 142 determines whether the selected device and the image forming apparatus 100 form the wire/wireless network, in response to the determined result of the transmission request determining unit 141 in which the transmission of the job history information to the selected device is requested, and outputs the determined result to the information request range determining unit 143.

For example, if the transmission of the job history information to device 1 illustrated in FIG. 3 is requested, the network formation determining unit 142 determines whether device 1 and the image forming apparatus 100 form the wire/wireless network.

The information request range determining unit 143 determines whether the transmission of all the job history information to the selected device is requested, in response to the determined result of the network formation determining unit 142 in which the selected device and the image forming apparatus 100 form the network, and outputs the determined result to the transmitting unit 144.

The transmitting unit 144 transmits all the job history information to the selected device, in response to the determined result of the information request range determining unit 143 in which the transmission of all the job history information to the selected device is requested.

In addition, the transmitting unit 144 transmits to the selected device the job history information corresponding to the selected device, in response to the determined result of the information request range determining unit 143 in which the transmission of all the job history information to the selected device is not requested.

As illustrated in FIG. 7, when the transmission of the job history information corresponding to device 1 is requested, the transmitting unit 144 transmits the job history information corresponding to device 1, that is, the job history information on the job data JOB1 and JOB4 to device 1.

Furthermore, the transmitting unit 144 transmits the network address together with the job history information.

The job history information and the network addresses, which are transmitted to the selected device, are used as reference material when the user performs the image forming job which was already performed again.

The memory unit 160 is the internal storage device included in the image forming apparatus 100 and may store the job history information and the job data.

The interface unit 170 performs an interface function for the wire/wireless network such that the image forming apparatus 100 can exchange information with the devices and other devices connected with the network.

The image forming engine unit 180 performs the image forming job of the job data in accordance with the instructions of the devices.

In the method and apparatus of providing devices with history information on image forming jobs according to an exemplary embodiment of the present invention, if the job history information on the image forming jobs, which is classified by the device, is stored and transmitted to the devices such that a user is allowed to verify the jobs already performed, the job which was already performed is conveniently performed again.

Furthermore, in the method and apparatus of providing devices with history information on image forming jobs according to an exemplary embodiment of the present invention, if the job history information on the image forming jobs is generated in an XHTML-print data form, the devices can receive the job history information through a network.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A computer-implemented method for providing devices with job history information on image forming jobs, the method comprising causing a computer to carry out the steps of:

identifying a plurality of devices;

classifying the job history information on image forming jobs according to each of the identified devices;

generating and storing job history information classified for each of the identified devices;

transmitting the job history information classified for each of the devices to a device selected by a user when a transmission of the job history information for all of the devices is requested; and transmitting the job history information classified for one of the devices to the corresponding device when a transmission of the job history information for the corresponding device is requested.

2. The method of claim 1, wherein the generating of the job history information is generated in an extensible hypertext markup language (XHTML)-print data form.

3. The method of claim 1, wherein the generating of the job history information is generated in an image forming apparatus.

4. The method of claim 1, wherein the generating of the job history information further comprises specifying a storage location for storing the job history information.

5. The method of claim 1, wherein the generating of the job history information is stored in at least one of an external storage device and an image forming apparatus.

6. The method of claim 1, wherein the generating of the job history information further comprises storing at least one of job data and reference information of the job data in accordance with a storage area size for storing the job data corresponding to the job history information.

7. The method of claim 6, further comprising network addresses of the plurality of devices for storing the job data are stored as reference information of the job data.

8. The method of claim 1, wherein the transmitting of the job history information comprises:

determining whether the transmission of the job history information is requested when the selected device and an image forming apparatus forms a network; and transmitting the job history information to the selected device when the transmission of the job history information is requested.

9. A non-transitory computer-readable medium having embodied thereon a computer program for the method of providing devices with job history information on image forming jobs, the method comprising:

identifying a plurality of devices;

classifying the job history information on image forming jobs according to each of the identified devices; and transmitting the job history information classified for each of the devices to a device selected by a user when a transmission of the job history information for all of the devices is requested; and transmitting the job history information classified for one of the devices to the corresponding device when a transmission of the job history information for the corresponding device is requested.

10. An apparatus for providing devices with job history information on image forming jobs, comprising:

a job history information generating unit for identifying a plurality of devices and classifying the job history information on image forming jobs according to each of the identified devices, the job history information generating unit comprising an information generating unit for generating and storing the job history information classified for each of the identified devices; and a job history information transmitting unit for transmitting the job history information classified for each of the devices to a device selected by a user when a transmission of the job history information for all of the devices is requested, and for transmitting the job history information classified for one of the devices to the corresponding device when a transmission of the job history information for the corresponding device is requested.

11. The apparatus of claim 10, wherein the job history information generating unit generates the job history information in an extensible hypertext markup language (XHTML)-print data form.

12. The apparatus of claim 10, wherein the job history information generating unit generates the job history information in an image forming apparatus.

13. The apparatus of claim 10, wherein the job history information generating unit further comprises a storage location specifying unit which specifies a storage location for storing the job history information.

14. The apparatus of claim 10, wherein the job history information is stored in an external storage device including at least one of a universal serial bus (USB) memory and a memory card.

15. The apparatus of claim 10, wherein the job history information generating unit further comprises a data storage instructing unit for instructing that at least one of job data and reference information of the job data is stored in accordance with a storage area size for storing the job data corresponding to the job history information.

16. The apparatus of claim 15, wherein the data storage instructing unit instructs that network addresses of the plurality of devices for storing the job data are stored as reference information of the job data.

17. The apparatus of claim 10, wherein the job history information transmitting unit comprises:
a transmission request determining unit for determining whether the transmission of the job history information is requested when the selected device and an image forming apparatus forms a network; and
a transmitting unit for transmitting the job history information to the selected device in response to a determined result of the transmission request determining unit.

18. The apparatus of claim 10, wherein each of the devices comprises at least one of a mobile communication terminal, a personal digital assistant (PDA), and a notebook type personal computer.

19. An apparatus for providing devices with job history information on image forming jobs, comprising:
a job history information generating unit for identifying a plurality of devices, classifying the job history information on image forming jobs according to each of the identified devices, and generating and storing the job history information classified for each of the identified devices;
a job history information transmitting unit for transmitting the generated job history information classified for each of the devices to a device selected by a user when a transmission of the job history information for all of the devices is requested, and for transmitting the generated job history information classified for one of the devices to the corresponding device when transmission of the job history information for the corresponding device is requested;
a memory unit for storing the job history information and job data;
an interface unit for performing an interface function for a wire/wireless network for exchanging with the at least one device connected with a network; and
an image forming engine unit for performing an image forming job of the job data in accordance with instructions of the at least one device.

20. The apparatus of claim 19, wherein the job history information generating unit generates the job history information in an extensible hypertext markup language (XHTML)-print data form.

21. The apparatus of claim 19, wherein the job history information generating unit generates the job history information in an image forming apparatus.

22. The apparatus of claim 19, wherein the job history information generating unit comprises:
a device identifying unit for identifying the at least one device;
a storage location specifying unit for determining whether at least one of an external storage device connected to the image forming apparatus and the image forming apparatus is selected as a storage device for storing the job history information;
an information generating unit for generating and storing the job history information classified for the identified device; and
a data storage instructing unit for determining whether a storage area for storing job data corresponding to the job history information exists.

23. The apparatus of claim 22, wherein the data storage instructing unit instructs that a network address of the at least one device for storing the job data is stored as reference information of the job data.

24. The apparatus of claim 19, wherein the job history information is stored in an external storage device including at least one of a universal serial bus (USB) memory and a memory card.

25. The apparatus of claim 19, wherein the at least one device comprises at least one of a mobile communication terminal, a personal digital assistant (PDA), and a notebook type personal computer.

26. The apparatus of claim 19, wherein the job history information transmitting unit comprises:
a transmission request determining unit for determining whether the transmission of the job history information is requested when the at least one device and the image forming apparatus forms a network;
a network information determining unit for determining whether the at least one device and the image forming apparatus for the wire/wireless network in response to a determined result of the transmission request determining unit;
an information request range determining unit for determining whether the transmission of the job history information to the at least one device is requested in response to the determined result of the network formation determining unit; and
a transmitting unit for transmitting the job history information and network address to the at least one device in response to a determined result of the transmission request determining unit.

* * * * *